Feb. 13, 1923.
B. F. TEEL
1,445,607
BELT REPLACER
Filed Feb. 21, 1921
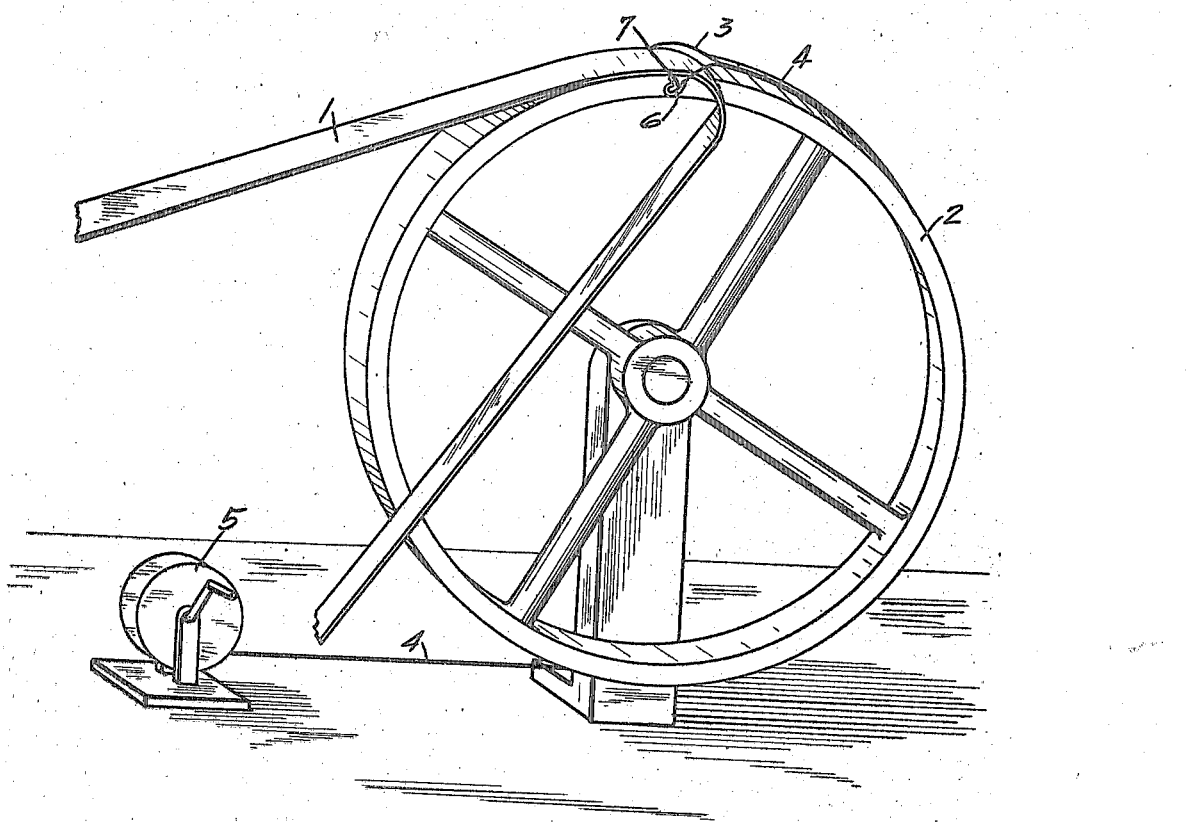
Benjamin F. Teel
INVENTOR.
BY
Hazard & Miller
ATTORNEY.

Patented Feb. 13, 1923.

1,445,607

UNITED STATES PATENT OFFICE.

BENJAMIN F. TEEL, OF FULLERTON, CALIFORNIA.

BELT REPLACER.

Application filed February 21, 1921. Serial No. 446,808.

*To all whom it may concern:*

Be it known that I, BENJAMIN F. TEEL, a citizen of the United States, residing at Fullerton, in the county of Orange and State of California, have invented new and useful Improvements in Belt Replacers, of which the following is a specification.

It is the object of this invention to provide means for replacing belts and particularly adapted for replacing belts upon large wheels, such as the band wheels of well drilling rigs.

The improved construction forms an extremely simple device whereby one operator may readily replace a belt upon even a comparatively large wheel, such as a band wheel.

The invention will be readily understood from the accompanying drawing which is a perspective view showing the operation of the belt replacer.

In the drawings I have illustrated the belt replacer as employed in connection with the band wheel 2 of a drilling rig, said band wheel being adapted to receive the belt 1.

The belt replacing device includes a cable 4 preferably having the split ends 3 terminating in hooks 6 which are adapted to be received in suitable eyes 7 provided upon opposite sides of the wheel 2 adjacent the periphery thereof.

In operation when the belt has come off of the band wheel, the upper portion of the belt is placed against the band wheel and the split end of cable 4 is received over the same with the hooks 6 engaged in eyes 7. The length of the cable is then passed rearwardly around the wheel 2 and the end of the cable may be connected to a suitable windlass 5 or like pulling means positioned convenient to the band wheel. By winding in the cable the band wheel will thus be rotated, and at the same time the split ends of the cable will firmly hold belt 1 to the band wheel so that during rotation of the latter the belt will be replaced.

Various changes may be made without departing from the spirit of the invention as claimed.

What is claimed is:

1. In means for replacing a belt upon a pulley having means for the securing of the split ends of a cable thereto, a cable adapted to pass around said pulley and having split ends respectively adapted to be so connected to said pulley as to rotate the same and simultaneously clamp the belt to the pulley, and pulling means connected to one end of said cable.

2. In belt replacing means, eyes upon a pulley, a cable adapted to pass around said pulley, said cable having split ends provided with means to engage said eyes and thereby clamp a belt to said pulley, and pulling means to which one end of said cable is connected.

3. In combination, a pulley having eyes upon the respective sides and adjacent the periphery thereof, a cable having split ends adapted to engage a belt and terminating in hooks adapted to engage said eyes.

In testimony whereof I have signed my name to this specification.

BENJAMIN F. TEEL.